United States Patent
Tan et al.

(10) Patent No.: US 9,529,459 B2
(45) Date of Patent: Dec. 27, 2016

(54) REDUCTION OF SILICON DIE SIZE FOR A NAVIGATIONAL SENSOR USING ULTRA HIGH FRAME RATE ACQUISITION

(71) Applicant: PixArt Imaging (Penang) SDN. BHD., Penang (MY)

(72) Inventors: Shan Chong Tan, Penang (MY); Kok Chin Pan, Penang (MY)

(73) Assignee: PixArt Imaging (Penang) SDN. BHD., Penang (MY)

( * ) Notice: Subject to any disclaimer, the term of this patent is extended or adjusted under 35 U.S.C. 154(b) by 57 days.

(21) Appl. No.: 14/257,014

(22) Filed: Apr. 21, 2014

(65) Prior Publication Data

US 2015/0301627 A1    Oct. 22, 2015

(51) Int. Cl.
*G06F 3/03*    (2006.01)
*G06F 3/0354*    (2013.01)
*G06F 3/038*    (2013.01)

(52) U.S. Cl.
CPC ........... *G06F 3/0383* (2013.01); *G06F 3/0317* (2013.01); *G06F 3/03543* (2013.01)

(58) Field of Classification Search
CPC .... G06F 3/03543; G06F 3/0317; G06F 3/033; G06F 3/03541; G06F 1/3203; G06F 3/03542; G06F 3/0383
USPC ................ 345/163–166, 179, 180
See application file for complete search history.

(56) References Cited

U.S. PATENT DOCUMENTS

| | | | |
|---|---|---|---|
| 6,455,840 B1 * | 9/2002 | Oliver et al. | 250/222.1 |
| 2004/0100444 A1 * | 5/2004 | Park et al. | 345/166 |
| 2004/0119695 A1 * | 6/2004 | Lee | 345/166 |
| 2004/0190085 A1 * | 9/2004 | Silverbrook | G06F 3/0317 358/474 |
| 2005/0068300 A1 * | 3/2005 | Wang et al. | 345/166 |
| 2005/0110746 A1 * | 5/2005 | Hou | 345/156 |
| 2005/0127990 A1 * | 6/2005 | Burt | H03F 1/26 330/9 |
| 2005/0200600 A1 * | 9/2005 | Lee | G06F 3/0317 345/156 |
| 2007/0002021 A1 * | 1/2007 | Lin | 345/166 |
| 2007/0247428 A1 * | 10/2007 | Hock et al. | 345/166 |
| 2009/0073456 A1 * | 3/2009 | Wax | G01N 21/4795 356/479 |
| 2010/0103107 A1 * | 4/2010 | Chao et al. | 345/166 |
| 2011/0234497 A1 * | 9/2011 | Zahnert et al. | 345/166 |
| 2013/0249800 A1 * | 9/2013 | Chung et al. | 345/166 |
| 2015/0211839 A1 * | 7/2015 | Salarian | G06F 3/033 702/95 |

FOREIGN PATENT DOCUMENTS

| | | |
|---|---|---|
| TW | I244044 | 11/2005 |
| TW | I345167 | 7/2011 |

* cited by examiner

*Primary Examiner* — Hong Zhou
(74) *Attorney, Agent, or Firm* — Winston Hsu; Scott Margo

(57) ABSTRACT

A navigation device having a small navigation sensor pixel array capable of ultra high speed imaging is proposed. A first image and a second image of a plurality of images are selected according to a predetermined difference between the corresponding acquisition times of the first image and the second image. The first image and the second image are compared to determine an amount of overlap between the first image and the second image. The predetermined difference is adjusted for subsequent image comparisons according to the amount of overlap between the first image and the second image.

14 Claims, 5 Drawing Sheets

REDUCTION OF SILICON DIE SIZE FOR A NAVIGATIONAL SENSOR USING ULTRA HIGH FRAME RATE ACQUISITION

BACKGROUND OF THE INVENTION

1. Field of the Invention

This application relates generally to a navigation sensor, and more specifically to reducing silicon die size requirements for a navigation sensor through the use of an ultra high frame rate acquisition system.

2. Description of the Prior Art

A navigation sensor, such as may be used in a computer mouse, compares an incoming image to a reference image to determine the change in displacement in x and y directions. In order to track motion accurately, there must be sufficient overlap between the incoming image and the reference image because the overlap contains the signals required for the navigation to process. The required signals normally indicate microscopic features of the tracking surface, of which a comparison of respective locations in the incoming image and the reference image signify speed and direction of movement of the navigation sensor.

In a typical navigation sensor, image acquisition is frame based, meaning there is a fixed time interval between successive image acquisitions. For example, a 5,000 frame per second sensor will acquire an image every 200 us.

Take an example navigation sensor with a 20×20 array of pixels, each pixel being 30 um in size. Assuming an overlap between the incoming image and the reference image must be at least a 10×10 pixel block for good navigation processing, the navigation sensor has an effective maximum "speed limit" above which the overlap will be smaller than required, resulting in less than desired navigation information. FIG. 1 illustrates a 10×10 image overlap in such an example navigation sensor required for proper navigation processing by a digital signal processor (DSP).

With this example navigation sensor, the maximum speed limit can be calculated as a 10 pixel x-axis displacement through a 1:1 (no magnification) lens in a 200 us time interval is equal to a 300 um movement in 200 us. Therefore, the maximum speed limit in the x-axis is 300 um/200 us=1.5 m/s, or approximately 60 inches per second (ips).

In the event that the navigation sensor is moved above this maximum speed limit, the overlap between the incoming image and the reference image becomes too small. An example of where the overlap between the incoming image and the reference image becoming too small due to exceeding the maximum speed limit is shown in FIG. 2, which shows a possible only 5×5 overlap between the images, which is insufficient for proper navigation processing by the DSP.

As described above, a navigation sensor has an effective maximum speed limit for proper navigation processing. Because of the need to provide enough overlapping pixels between the incoming image and the reference image while still permitting enough motion between frames to be useful has placed a restriction on the minimum size of a conventional navigation sensor pixel array. Due to this restriction, the size of the navigation sensor array traditionally occupies approximately 30%-45% of expensive die area in the navigation sensor, a size range which is not easily shrinkable. Thus a navigation sensor has hitherto not benefited from the continuing technological trend of die miniaturization and associated reduction in costs.

SUMMARY OF THE INVENTION

To solve the above recited problems a novel navigation device is disclosed having a smaller image sensor and a control circuit configured to receive images from the image sensor at a ultra high frame rate so that movement of the navigation device can still be determined according to the received images. The control circuit may be further configured to adjust the frame rate according to an amount of overlap between successively received images. A transfer amplifier and analog to digital converter configured to operate at up to 100 megahertz may be used to transfer acquired images from the image sensor to the control circuit for processing.

A novel method applied to a navigation device to reduce silicon die size is also disclosed that includes acquiring a plurality of images via an image sensor array, each of the plurality of images having a different corresponding acquisition time. A first image and a second image of the plurality of images are selected according to a predetermined difference between the corresponding acquisition times of the first image and the second image. The first image and the second image are compared to determine an amount of overlap between the first image and the second image. The predetermined difference used for subsequent image comparisons is adjusted according to the amount of overlap between the first image and the second image. One or more thresholds may be used to determine adjustment of the predetermined difference.

Another novel method which reduces silicon die size for an image sensor array in a navigation device is disclosed. An image sensor smaller than a twenty pixel by twenty pixel array is utilized that receives images from the image sensor at a frame rate high enough to obtain a predetermined overlap area between successively compared images so that movement of the navigation device can be determined according to the received images. The method may include adjusting the frame rate for subsequent comparisons according to an amount of the overlap between successively compared images and/or determining whether to use consecutive received images for subsequent comparisons to determine to movement of the navigation device according to an amount the overlap between compared images.

These and other objectives of the present invention will no doubt become obvious to those of ordinary skill in the art after reading the following detailed description of the preferred embodiment that is illustrated in the various figures and drawings.

DETAILED DESCRIPTION

To overcome the prior art problems cited above, a new, small pixel array navigation sensor capable of ultra high speed imaging is proposed.

A small navigation sensor array, for example a 12×12 pixel array, may be used, although the specific size of the pixel array is not limited. Even though the 12×12 pixel array is only slightly larger than a 10×10 pixel overlap area frequently used for navigation processing, the difference in size between the small pixel array and the overlap area is enough if the frame rate is high enough.

Figure 1:
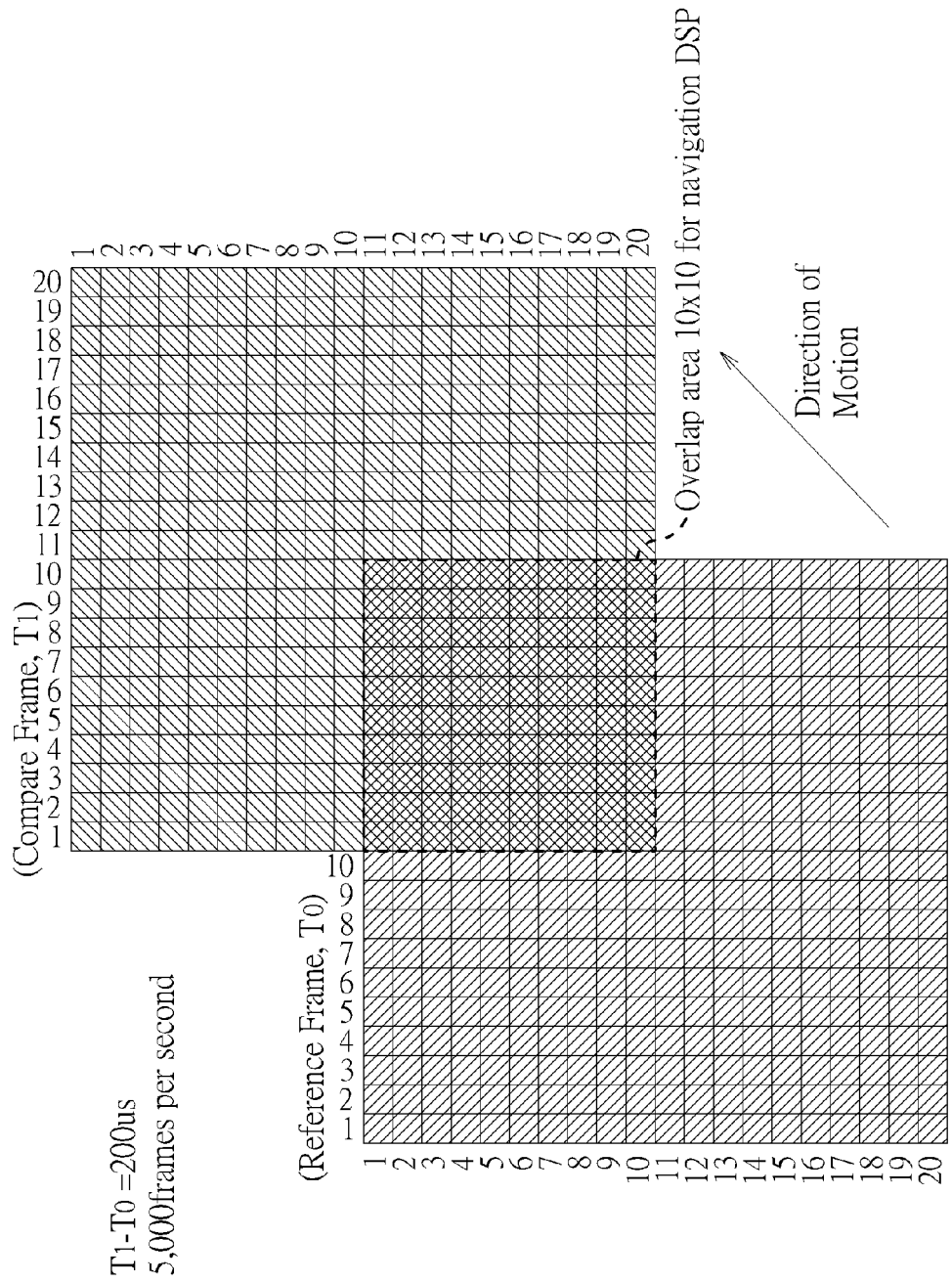
FIG. 1 is a diagram illustrating a possible image overlap area for a navigation DSP at 5,000 frames per second.
Figure 2:
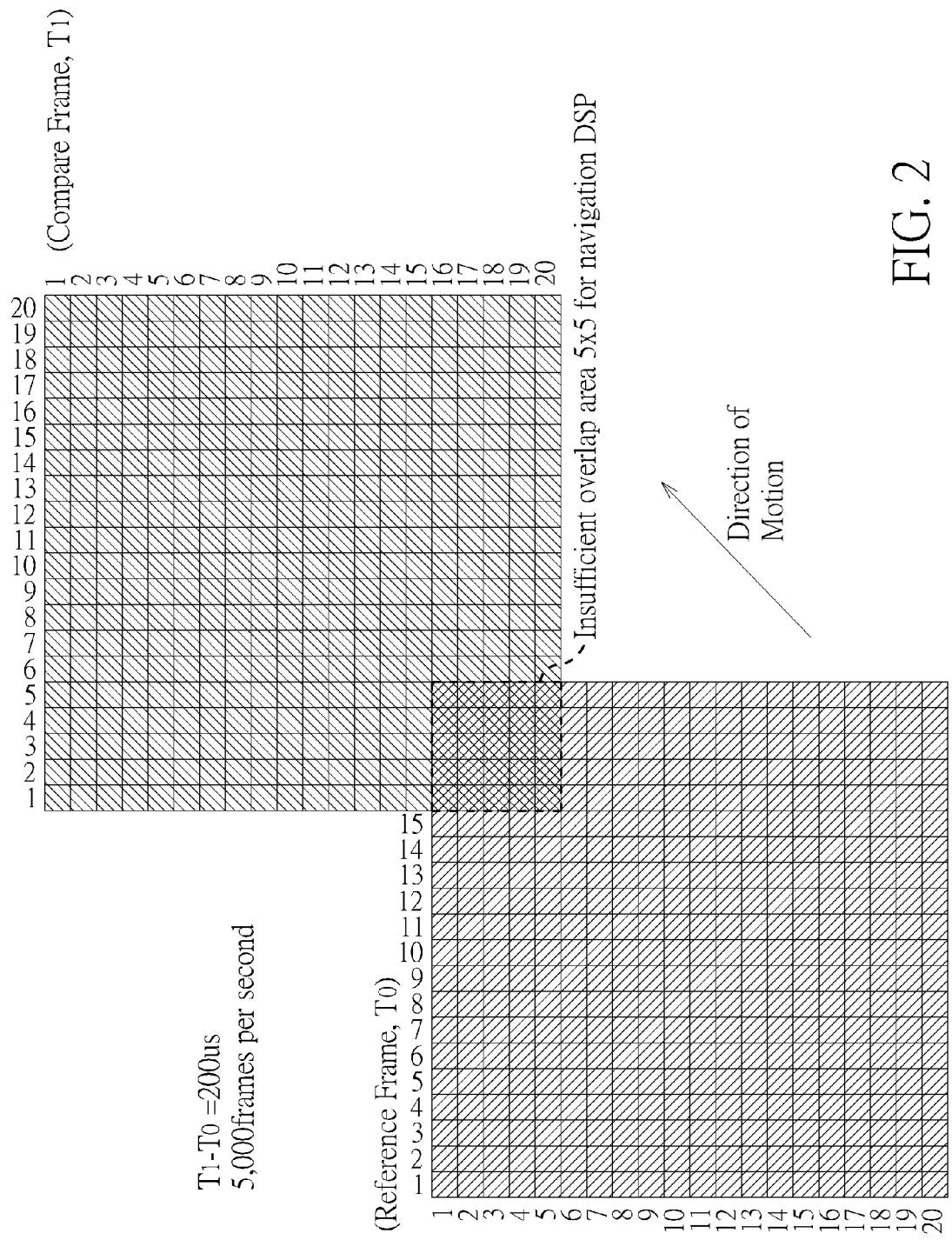
FIG. 2 is a diagram illustrating a possible insufficient image overlap area for a navigation DSP at 5,000 frames per second when the navigation DSP is moved too quickly.
Figure 3:
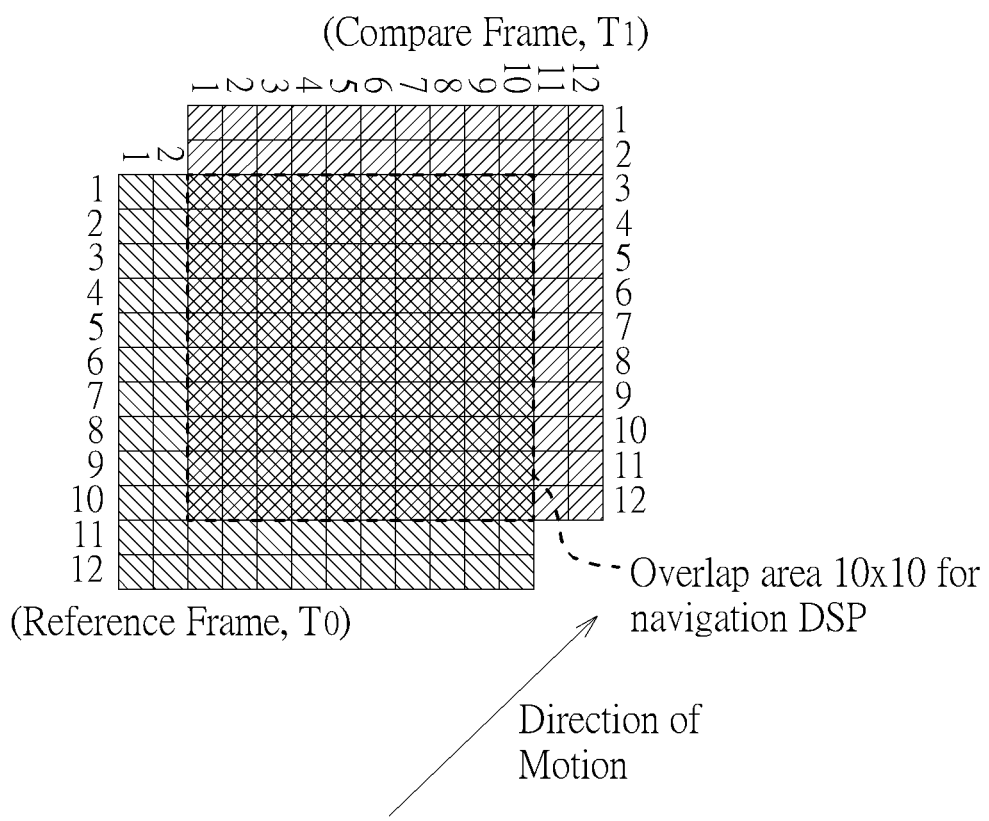
FIG. 3 is a diagram illustrating a possible image overlap area for a navigation DSP having a 12×12 pixel array sensor at 25,000 frames per second.

For example, using a high speed transfer amplifier and an analog-to-digital converter (ADC) operating at approximately 100 MHz to transfer acquired image data from the navigation sensor to the control circuit, frame rates as high as 25,000 frames per second may be obtained, although specific frame rates are also not limiting. Under such a high speed imaging navigation system, the 60 ips (described above as the maximum speed limit for a traditional navigation sensor array) translates into only about 2 pixels of displacement during the period of 40 us occurring between acquisition of two successive frames. Please refer to FIG. 3 showing a two pixel displacement between successive images when using a 12×12 pixel array. As shown, the two pixel displacement in the disclosed 12×12 pixel array gives the same 10×10 overlap area as shown in the 20×20 pixel array of the prior art and hence should produce a similar tracking performance.

Even though the tracking performance may be similar to the prior art, there is a large difference in required silicon die size required for the navigation sensor. Assuming the same 30 um pixel design is used, the prior art's 20×20 pixel array requires $(20 \times 30 \text{ um})^2 = 0.36 \text{ mm}^2$, while the disclosed 12×12 pixel array only requires $(12 \times 30 \text{ um})^2 = 0.13 \text{ mm}^2$, or almost a 3× reduction in die area.

Furthermore, the size of the digital hardware and the number of memory cells required to process a 12×12 navigation sensor pixel array (144 data points) is also a small fraction of what the prior art requires to process a 20×20 pixel array with 400 data points, reducing costs and complexity even more.

Figure 5:
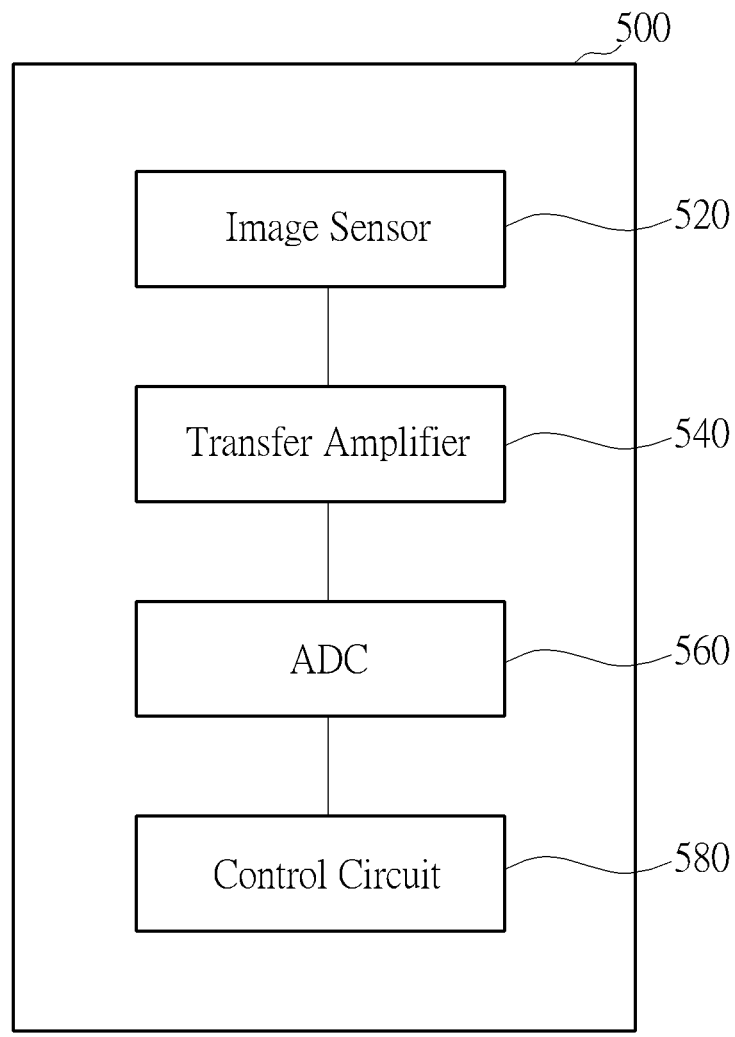
FIG. 5 is a navigation device according to an embodiment of the disclosure.

FIG. 5 is a functional block diagram of a navigation device 500 according to one embodiment. The navigation device 500 includes a navigation sensor array, preferably less than 20×20 pixels in size and configured to acquire images. Acquired images are transferred to a control circuit 580 for processing via a high speed transfer amplifier 540 and an ADC 560 preferably operating at high frequency, possibly in the 100 MHz range.

The control circuit 580 is configured to compare two images, determine an overlapping portion of the images, and determine speed and displacement of the navigation sensor 520 occurring between acquisition times of the two images.

In some embodiments of the disclosed navigation device, it may not be optimal to process images at the fastest possible rate at all times. For example, the previously described 60 ips poises no problem as 60 ips translates into about 2 pixels of displacement during the period of 40 us occurring between acquisition of two successive frames at the maximum processing rate. However, suppose the navigation sensor is moved much slower than 60 ips, say only 10 ips for example. This 10 ips translates into less than 1 pixel of displacement during the period of 40 us occurring between acquisition of two successive frames at the maximum processing rate, thus it may be erroneously determined that the navigation sensor is stationary, resulting in a navigation error.

To avoid similar navigation errors, the disclosed navigation device may be operated by acquiring a plurality of images via the image sensor array, each of the plurality of images having a different corresponding acquisition time. A first image and a second image of the plurality of images are selected according to a predetermined difference between the corresponding acquisition times of the first image and the second image. The first image and the second image are compared to determine an amount of overlap between the first image and the second image. The predetermined difference between the corresponding acquisition times of subsequent images used for comparison is adjusted according to the amount of overlap between the first image and the second image. Thus the control circuit 580 may be further configured to dynamically adjust the predetermined difference used in determining which images are selected for subsequent image comparisons.

In other words, when the navigation device detects increased speed of the navigation sensor according to a threshold, the amount of time between the acquisition times of images that are compared may be dynamically decreased. When the navigation device detects decreased speed of the navigation sensor according to a threshold, the amount of time between the acquisition times of images that are compared may be dynamically increased. This dynamic adjustment of the amount of time between the acquisition times of images that are compared can be done to ensure that proper displacement will be determined while maintaining the preferred size of overlap in the images regardless of the speed of the navigation sensor. Some embodiments may use more than one threshold to determine whether to increase or decrease the amount of time between the acquisition times of images that are compared. Some embodiments use displacement of the navigation sensor to determine dynamic adjustment of the predetermined difference instead of the amount of overlap between the compared images, and both methods are intended to fall within the scope of the claims.

Figure 4:
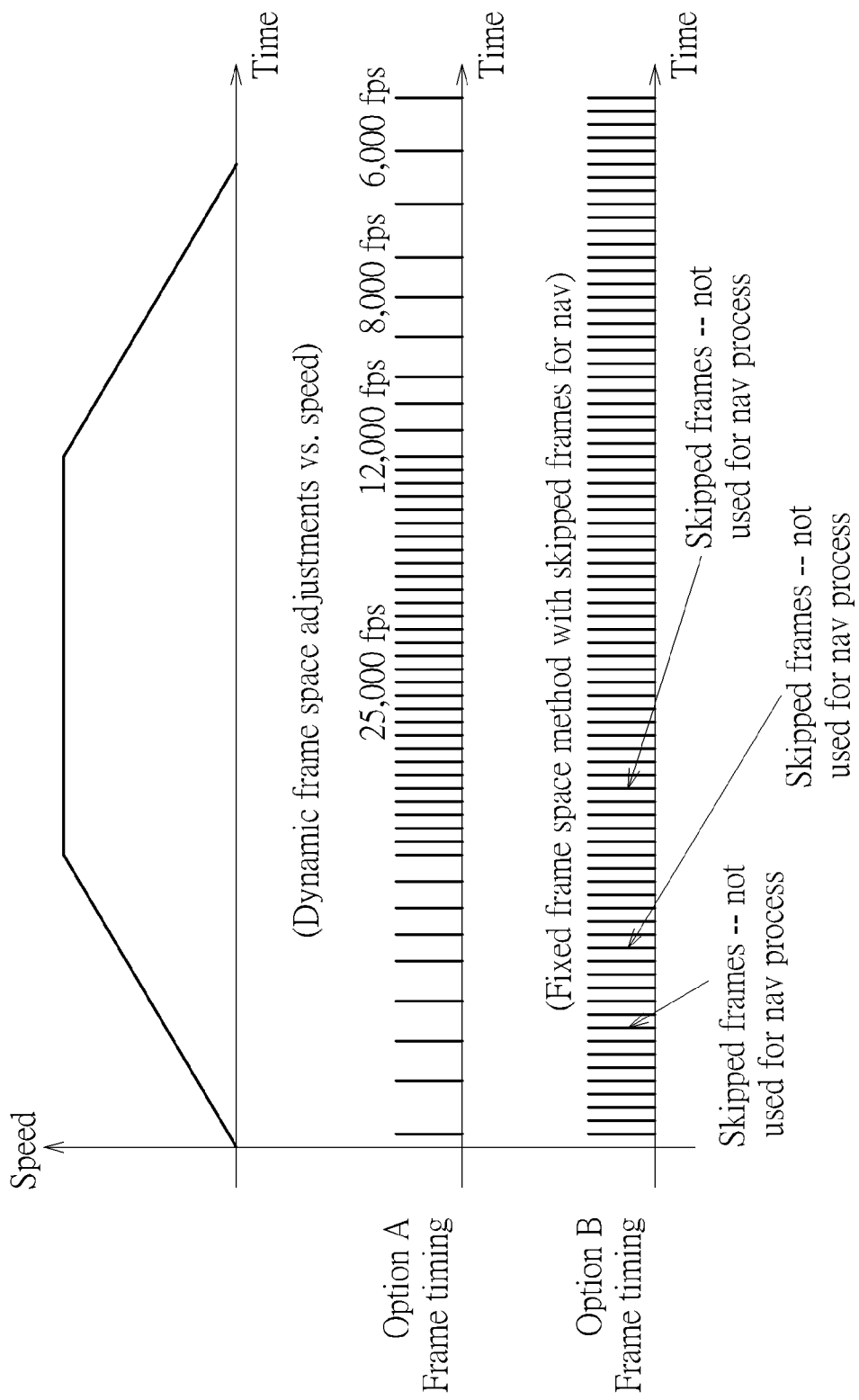
FIG. 4 illustrates dynamic adjustment of frame rates according to detected speed of motion of the navigation DSP.

Please refer to FIG. 4, which is a graph illustrating dynamic adjustment of the predetermined difference. In FIG. 4, the vertical axis represents speed, in this case an increase in speed representing a decrease in the amount of time between the acquisition times of images that are compared. The horizontal axis represents time, and the numerous short vertical bars shown in Option A and Option B represent acquired frames.

As shown in Option A of FIG. 4, some embodiments adjust the predetermined difference by increasing frame rate of the image sensor array when the amount of overlap between the first image and the second image changes from being greater than or equal to a predetermined threshold to being less than the predetermined threshold and by decreasing frame rate of the image sensor array when the amount of overlap between the first image and the second image changes from being less than a predetermined threshold to being greater than or equal to a predetermined threshold.

As shown in Option B of FIG. 4, images may continue to be acquired at a more or less constant frame rate; however, not all of the acquired images are always selected to compute displacement. Some acquired images are not selected and are ignored. Thus some embodiments adjust the predetermined difference by decreasing a number of non-selected images (i.e., select more images) of the plurality of images having corresponding acquisition times between the corresponding acquisition times of the first and the second images when the amount of overlap between the first image and the second image changes from being greater than or equal to a predetermined threshold to being less than the predetermined threshold, and by increasing a number of non-selected images (i.e., select fewer images) of the plurality of images having corresponding acquisition times between the corresponding acquisition times of the first and the second images when the amount of overlap between the first image and the second image changes from being less than a predetermined threshold to being greater than or equal to a predetermined threshold.

The navigation device is not limited to an overlap area of 10×10 pixel overlap between images. The 10×10 pixel overlap is only an example to illustrate aspects of the present invention for clarity and not intended to limit the scope of the invention. The overlap area of the navigation device may be determined according to the signal to noise ratio of the navigation device as well as strength of a filter of the navigation device.

The navigation device may run at a frame speed of at least 15,000 frames per second. The pixel array may be smaller than 20×20 pixel array. The navigation device has a speed of at least 1.0 m/s, or approximately 40 ips in either x or y direction.

In summary, a navigation device having a small array navigation sensor capable of ultra high speed imaging is proposed that utilizes dynamic adjustment of a predetermined difference between the corresponding acquisition times of a first image and a second image according an amount of overlap between the first image and the second image. The novel high speed imaging and dynamic adjustment of image selection by the navigation device permits proper navigation determination while having the advantages over prior art navigation devices of savings in costs, die size, and related memory requirements and circuitry complexity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical mouse comprising:
   an image sensor; and
   a control circuit configured to receive images from the image sensor at a frame rate, the frame rate being high enough to obtain a predetermined overlap area between compared images when the optical mouse is moved at least 1.5 meters per second so that movement of the optical mouse can be determined according to the compared images, wherein the frame rate is 25,000 frames per second;
   wherein the image sensor is smaller than or equal to a 12 by 12 pixel array.

2. The optical mouse of claim 1, wherein the control circuit is further configured to adjust the frame rate according to an amount of the overlap between successively compared images.

3. The optical mouse of claim 1, wherein the control circuit is further configured to determine whether to use consecutive compared images to determine movement of the optical mouse according to an amount of the overlap between successively compared images.

4. The optical mouse of claim 1, further comprising a transfer amplifier and analog to digital converter configured to operate at up to 100 megahertz.

5. A method of reducing silicon size for an image sensor array in an optical mouse, the method comprising:
   providing an image sensor smaller than or equal to a 12 by 12 pixel array; and
   receiving images from the image sensor at a frame rate, the frame rate being high enough to obtain a predetermined overlap area between compared images when the optical mouse is moved at least 1.5 meters per second so that movement of the optical mouse can be determined according to the compared images, wherein the frame rate of is 25,000 frames per second.

6. The method of claim 5, further comprising adjusting the frame rate according to an amount of the overlap between compared images.

7. The method of claim 5, further comprising determining whether to use consecutive compared images to determine to movement of the optical mouse according to an amount the overlap between compared images.

8. The method of claim 5, further comprising operating a transfer amplifier and analog to digital converter substantially at 100 megahertz.

9. An optical mouse comprising:
   a transfer amplifier and analog to digital converter configured to operate at up to 100 megahertz;
   an image sensor; and
   a control circuit configured to receive images from the image sensor at a frame rate, the frame rate being high enough to obtain a predetermined overlap area between compared images when the optical mouse is moved at least 1.5 meters per second so that movement of the optical mouse can be determined according to the compared images, wherein the frame rate is 25,000 frames per second;
   wherein the image sensor is smaller than or equal to a 12 by 12 pixel array.

10. The optical mouse of claim 9, wherein the control circuit is further configured to adjust the frame rate according to an amount of the overlap between successively compared images.

11. The optical mouse of claim 9, wherein the control circuit is further configured to determine whether to use consecutive compared images to determine movement of the optical mouse according to an amount of the overlap between successively compared images.

12. A method of reducing silicon size for an image sensor array in an optical mouse, the method comprising:
   providing a transfer amplifier and analog to digital converter substantially at 100 megahertz;
   providing an image sensor; and
   receiving images from the image sensor at a frame rate of 25,000 frames per second to obtain a predetermined overlap area between compared images when the optical mouse is moved at least 1.5 meters per second so that movement of the optical mouse can be determined according to the compared images;
   wherein the image sensor is smaller than or equal to a 12 by 12 pixel array.

13. The method of claim 12, further comprising adjusting the frame rate according to an amount of the overlap between compared images.

14. The method of claim 12, further comprising determining whether to use consecutive compared images to determine to movement of the optical mouse according to an amount the overlap between compared images.

* * * * *